Dec. 5, 1933.  J. W. GREER  1,938,423
CLUSTER FORMING MACHINE
Filed April 29, 1932  4 Sheets-Sheet 1
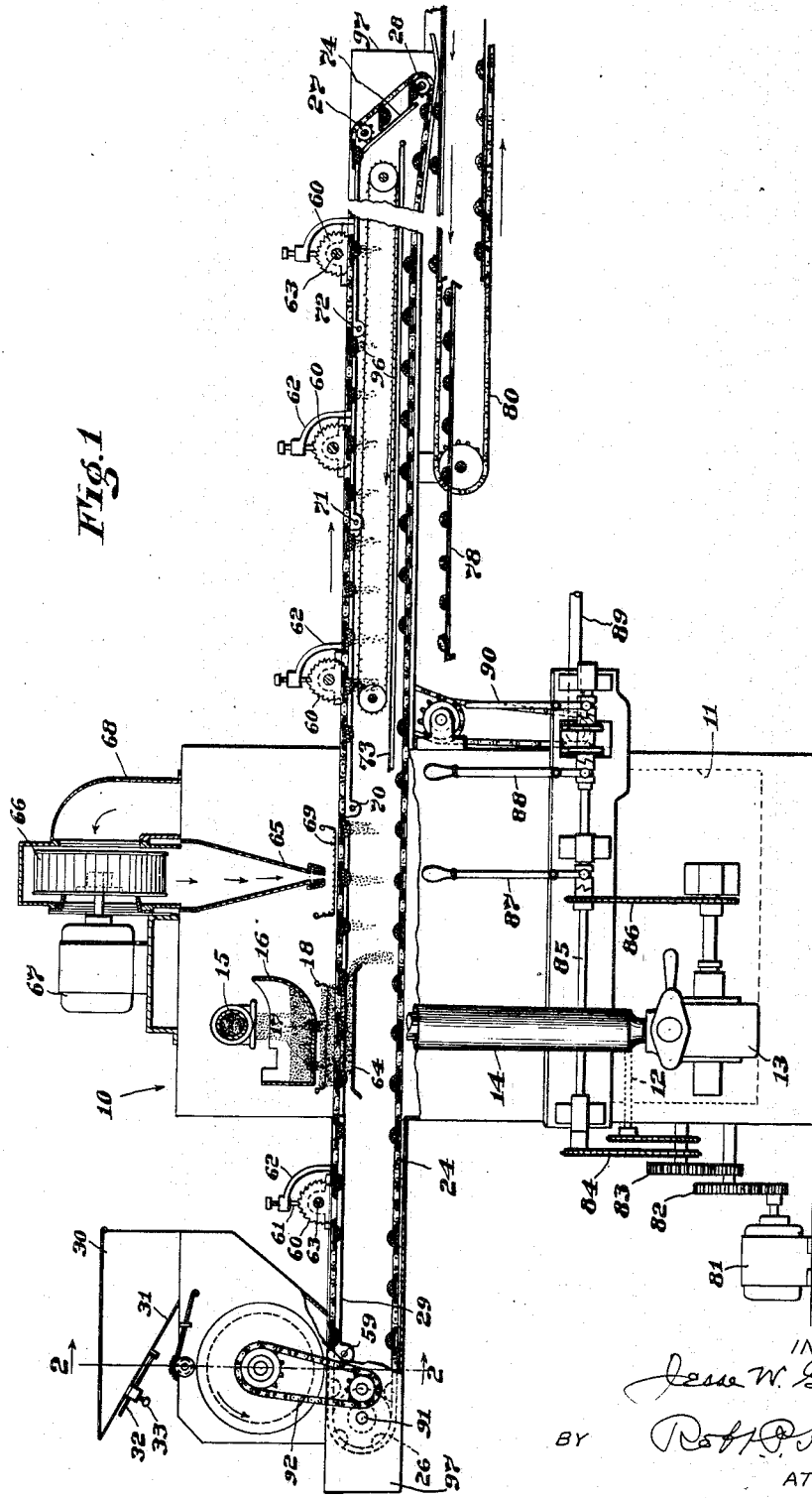

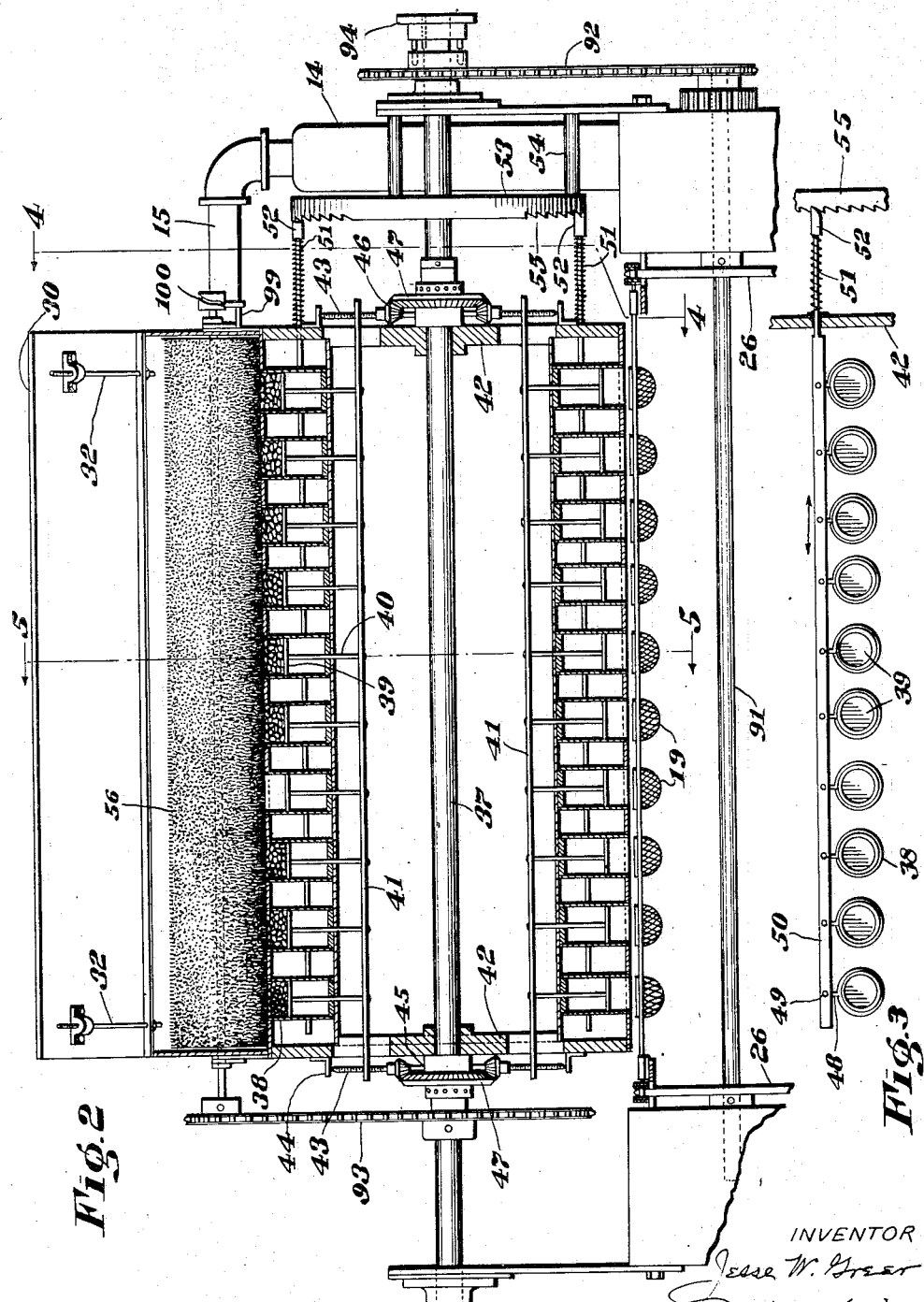

Dec. 5, 1933.   J. W. GREER   1,938,423
CLUSTER FORMING MACHINE
Filed April 29, 1932     4 Sheets-Sheet 3
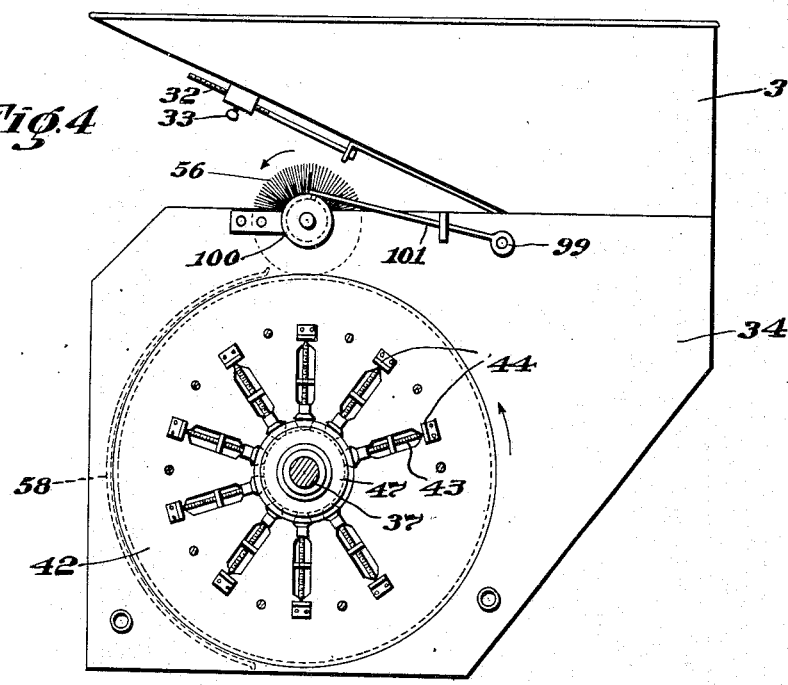
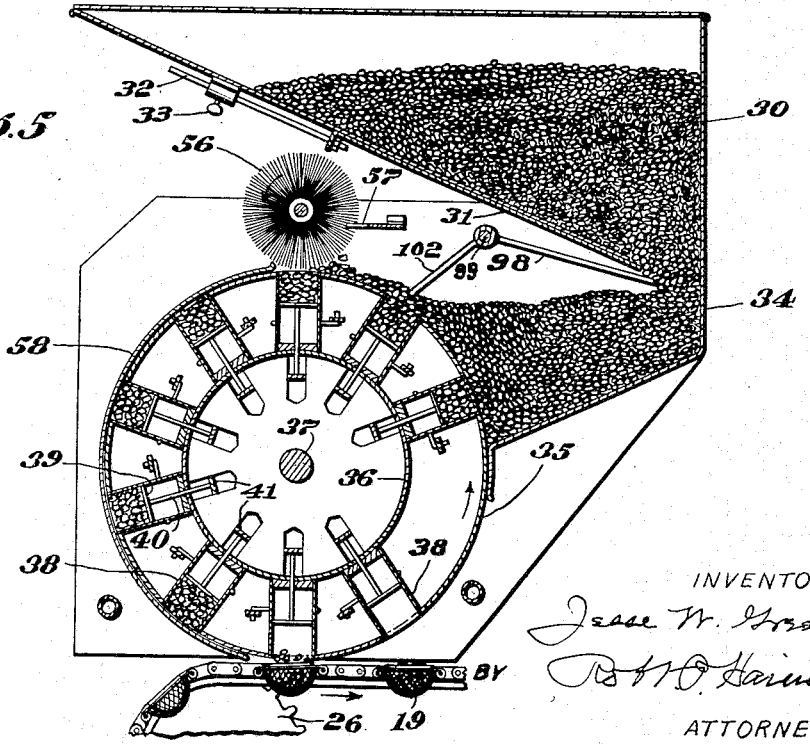
INVENTOR
Jesse W. Greer
BY
ATTORNEY Dec. 5, 1933.                 J. W. GREER                 1,938,423
                         CLUSTER FORMING MACHINE
                        Filed April 29, 1932          4 Sheets-Sheet 4
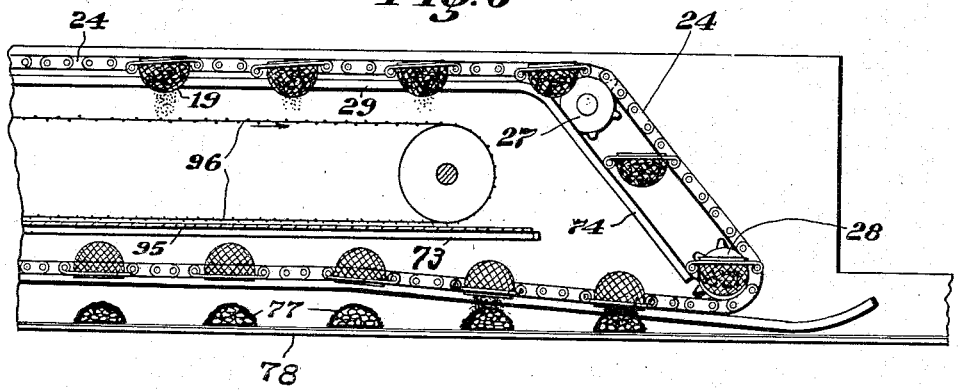
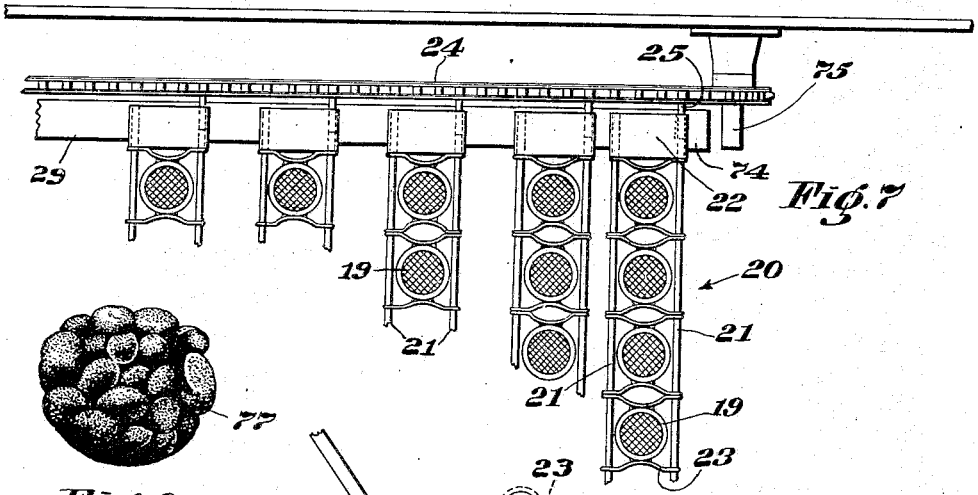
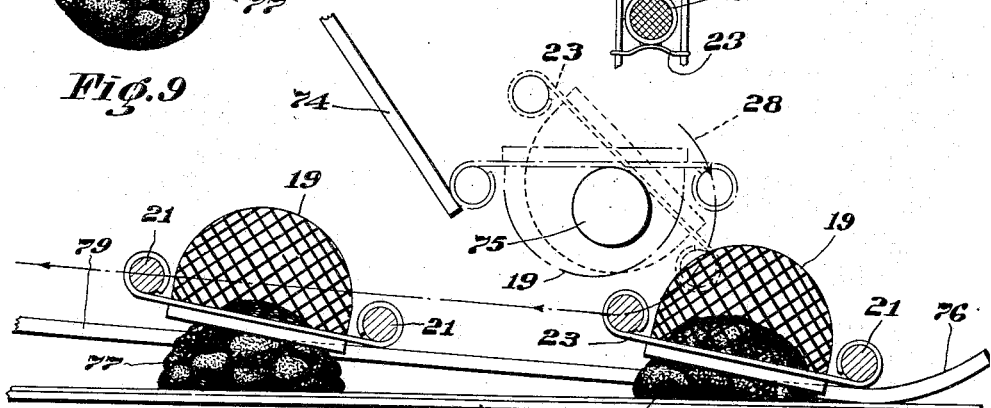

Patented Dec. 5, 1933

1,938,423

UNITED STATES PATENT OFFICE 1,938,423

CLUSTER FORMING MACHINE

Jesse W. Greer, Cambridge, Mass.

Application April 29, 1932. Serial No. 608,203

18 Claims. (Cl. 107—1)

This invention relates to the manufacture of coated cluster confections and to an improved method of and machine for making such clusters.

There is a large market for coated clusters formed of peanuts, raisins or other small edibles coated with chocolate or other coating materials adapted to bind a number of the edibles together in the form of a mound or cluster.

While various kinds of nuts or dried fruits may be used as the fillings for the clusters, inexpensive edibles such as peanuts and raisins are commonly used as the fillings and chocolate is commonly employed to coat the fillings and bind them into a cluster.

Cluster making machines provided with wire baskets adapted to contain the peanuts or other fillings while the coating material is applied thereto have been proposed heretofore, but the requirements of the candy manufacturers as to the size, shape and percentage of chocolate used in forming the clusters are exacting and the machines employed heretofore have been incapable of fully meeting these requirements at a low operating cost.

One frequent requirement in manufacturing clusters is that every peanut or the like at the surface of the filling shall be completely coated so that no uncoated portions will be visible in the finished cluster; a second frequent requirement is that the cluster shall have a well mounded shape, and a third is that the chocolate contents of a cluster shall be considerably less than the filling contents.

In operating the cluster making machines provided heretofore difficulty has been experienced in removing the coated clusters from the baskets unless the chocolate is maintained in such a soft condition that the clusters will not mold well when discharged from the baskets. This causes them to assume a relatively flat condition instead of the desired mound shape. Difficulty has also been experienced heretofore in coating all portions of the clusters without using a higher percentage of chocolate than is desired by the candy manufacturers.

Having in mind the foregoing the present invention relates to an improved method of and thoroughly efficient machine for manufacturing well shaped and completely coated clusters, having a chocolate content which may be as low as one-third chocolate to two-thirds peanuts.

In manufacturing clusters heretofore much difficulty and annoyance has been experienced due to the tendency of some of the coated clusters to remain in the baskets after they are inverted, with the result that some baskets are not emptied when they are returned to the filling position, and in an effort to decrease the tendency of the clusters to remain in the inverted baskets it has been customary to maintain the chocolate at a higher temperature than is desired for proper shaping of the clusters as they are discharged from the baskets.

A feature of the present invention of primary importance resides in means for turning the cluster containing baskets over with a quick striking action to jar the clusters out of the baskets as they reach the inverted position. As a result of this feature of the invention the annoying tendency of the clusters to stick in the baskets is entirely overcome, and a stiffer coating may be used than heretofore with a resulting improvement in the shape of the finished clusters.

A more specific feature of the invention resides in carrier frames each provided with a row of cluster forming baskets, and means for pivotally securing these frames to the chains so that each frame may be quickly turned over about its pivots with a striking action to dislodge the clusters from the inverted baskets.

A further feature of the invention resides in means for vibrating the baskets and fillings therein while they are immersed in the coating material so as to insure that all portions of the clusters will be coated.

A further feature of the invention resides in means for directing a strong air blast against the coated clusters and for repeatedly vibrating the clusters to remove the excess coating material therefrom, so as to secure the desired percentage of coating or binding material to the fillings in the finished clusters.

Still a further feature of the invention resides in an automatic feeder for delivering the cluster fillings into the cluster forming baskets and in means for accurately measuring the fillings for each basket, and more particularly to vibrating means associated with the measuring cups and adapted to vibrate the cups while in their upper position to properly fill them and to vibrate the cups while in their lower or discharge position to prevent the fillings from lodging therein. A further feature resides in manually operable means for simultaneously adjusting the size of all the measuring cups to vary their capacity.

Other features of the invention and novel combination of parts in addition to the above will be hereinafter described in connection with the accompanying drawings which illustrate one good practical form of the invention.

In the drawings:—

Fig. 1 is a side elevation with parts in section of a cluster forming machine constructed in accordance with the present invention;

Fig. 2 on an enlarged scale is a vertical sectional view taken on the line 2—2 of Fig. 1;

Fig. 3 is a plan view of means for vibrating a row of filling measuring cups;

Fig. 4 is a sectional view taken on the line 4—4 of Fig. 2;

Fig. 5 is a sectional view taken on the line 5—5 of Fig. 2;

Fig. 6 is a vertical sectional view through the delivery end portion of the carriers for the cluster forming baskets;

Fig. 7 is a top plan view of part of the construction of Fig. 6;

Fig. 8 on an enlarged scale is a side elevation illustrating how the cluster supporting baskets are emptied; and Fig. 9 is a bottom perspective view of a completed cluster.

The cluster forming machine of the present invention may be employed to form clusters of nuts, raisins, jelly beans or other small fillings or edibles which it is desired to coat and combine together to form a mound or cluster, and chocolate or other coating material may be employed to coat the fillings and hold them together. It is found in practice, however, that there is a large demand for clusters formed of small peanuts such as the Spanish peanuts coated with chocolate and the present machine operates particularly well in forming clusters consisting of these peanuts which are coated and held together by chocolate to form a mound or cluster.

The coating means herein shown and described for the most part may be constructed to operate in a well known manner and as shown comprises a closed casing 10 through which the clusters to be coated are conveyed in a manner to be described. In the lower portion of the casing 10 is provided the usual chocolate tank 11 in which is mounted the power driven agitator or stirrer shaft 12. The chocolate within the tank 11 is maintained at the desired temperature by steam pipes or other suitable heating means, not shown, and the hot chocolate flows through a pipe leading from the bottom of the tank 11 to the chocolate pump 13. This pump in the construction shown forces the chocolate upwardly through the jacketed pipe 14 and horizontally through the pipe 15 that extends inwardly through a side wall of the casing 10 to deliver the hot chocolate to the flow pan 16. The jacketed pipe 14 may be supplied with cooling water in a well known manner to reduce the temperature of the chocolate passing through this pipe. The shower pan 16 may be provided with the discharge slots 17 and below the shower pan is preferably provided the screens 18 adapted to catch lumps of chocolate or other deposits, and this screen serves also to cause the stream of chocolate to spread out and to be distributed more uniformly to the cluster carrying baskets to be described.

In accordance with the present invention the peanuts or other cluster forming fillings are deposited by means to be described in relatively small wire baskets 19, and as many of these baskets as desired may be secured side by side in a row transversely of the machine. All of the baskets 19 forming a transverse row are mounted in a support or frame 20 which, as best shown in Fig. 7, comprises the spaced transversely extending rods 21 which are rigidly connected at their ends to the plates 22 and the baskets 19 are supported between the spaced bars 21 by the wires 23 which are shown as soldered to the opposite sides of the baskets.

The basket supporting frames 20 are advanced through the coating machine by the endless chains 24 and in accordance with an important feature of the present invention each frame 20 is pivotally connected to the spaced chains 24, so that these baskets upon reaching a predetermined point in their path of travel may be turned over relatively to the chains with a striking action so as to jar the freshly coated clusters out of the baskets. To this end in the construction shown the forward rod 21 of each frame 20 has a socket formed at each end thereof to pivotally receive a pin 25 projecting laterally from a link of each side chain 24.

The side chains 24 travel in an endless path in the direction indicated by the arrows in Fig. 1 and pass about the sprockets 26 rotatably supported at the receiving end of the machine and pass about the upper sprockets 27 and lower sprockets 28 at the delivery end of the machine. The upper run of each chain 24 preferably rests upon and is supported by the side rails or runways 29 and the rear rod 21 of each basket supporting bracket may rest upon these runways 29. The arrangement is such that as the basket supporting frames 20 are advanced along the upper run of their path of travel the forward portion of each frame is supported by the pivot pins 25 which connect the frames to the side chains and the rear portion of each frame rests upon the runways 29.

If the clusters produced by the machine of the present invention are to be substantially uniform in size and shape it is important that the same amount of peanuts or other fillings be supplied to each basket 19 before these baskets are presented to the coating mechanism. Another feature of the present invention therefore, resides in automatic feeding mechanism for accurately measuring and delivering to each basket 19 a predetermined quantity of edibles such as peanuts. The means of the present invention for accomplishing this comprises the feeding hopper 30 in which the cluster fillings are placed and at the bottom of this hopper is provided the discharge opening, the size of which may be regulated as desired by adjusting the sliding gate 31 having the rods 32 and clamping screws 33 for securing the gate in the desired position of adjustment. Below the hopper 30 is provided the feed chamber 34 adapted to deliver the fillings to cups or pockets carried by a revolving drum. This drum as shown comprises the outer cylinder 35 and a concentric inner cylinder 36 and these two cylinders are rigidly secured to the central supporting and driving shaft 37. Within the space between the two cylinders 35 and 36 are mounted the desired number of pockets or measuring cups, and these cups in the construction shown are formed of the tubes 38, the inner ends of which are seated upon the inner cylinder 36 and the outer ends of these tubes are rotatably mounted in openings formed in the outer cylinder 35, the arrangement being such that the outer ends of the cups or tubes 38 lie flush with the outer periphery of the cylinder 35.

It may be desirable from time to time to vary the capacity of the measuring cups 38 in order to produce clusters of different size and this is readily accomplished in accordance with the present invention by providing each tube 38 with an adjustable bottom 39 comprising a disk slidably supported in the tube by the central spindle 40 and the opposite end of each spindle is rigidly secured to a transversely extending bar 41 as best shown in Fig. 2. The opposite ends of each bar 41 project outwardly through elongated slots in the end walls 42 of the rotating drum and each end of these bars is threadedly connected to an adjusting screw 43, the opposite ends of these screws being rotatably mounted in supporting brackets 44 and 45. The arrangement is such that the bottoms of all of the cups 38 in a transverse row of the drum may be adjusted as desired by rotating the screws 43 at the opposite ends of the rod 41.

It is desirable to provide means for simultaneously adjusting the size of all the cups of the drum and this is accomplished in accordance with the present invention by providing each screw 43 near its inner end with a small beveled pinion 46 arranged so that all the pinions at one end of the drum mesh with a beveled gear 47 which is rotatably mounted upon the drum shaft 37. The arrangement is such that the capacity of all of the cups 38 may be increased or decreased as desired by rotating the pair of beveled gears 47 by a spanner wrench or the like to effect the desired radial movement of all the rods 41 either toward or from the central shaft 37.

It will be seen from the construction of the feed mechanism so far described that as the drum provided with the cups 38 is rotated in the direction indicated by the arrow in Figs. 4 and 5 the peanuts or other fillings within the chamber 34 will flow into the cups to fill them, and in order that the peanuts may be shaken down in each cup to completely fill the same means is provided in accordance with the present invention for vibrating each cup while the same is being filled and also to vibrate the cup while it is being emptied to prevent the peanuts from lodging therein when the same is inverted. The desired vibration of each cup is secured in the construction shown by attaching to the central portion of each tube or cup 38 a laterally projecting arm 48, the outer end of which is connected by the pin 49 to a rod 50 extending lengthwise of the drum and supported thereby for sliding or vibratory movement in the direction of its length. Each of these rods 50 is continuously urged in an outward direction by a coil spring 51 confined between the end plate 42 and a head 52 provided at the outer end of each bar 50. The desired vibratory movement is imparted to each rod 51 by providing in spaced relation to one end of the drum the fixed ring 53 which may be supported from the machine frame by the spaced posts 54 and the upper and lower portions of the ring 53 are provided with ratchet teeth 55. The arrangement is such that as each head 52 of a cup vibrating rod 50 slides over the ratchet teeth 55 due to the rotation of the drum relative to the ring 53, the rod will be vibrated to rock or shake the cups 38. This will serve to shake the peanuts down in the cups being filled and to prevent the peanuts from lodging in the cups being emptied.

As each cup is filled with the cluster forming peanuts or the like the excess peanuts are brushed off of the top of the cups by the brush 56 which rotates in the direction indicated by the arrow in Fig. 5 and the peanuts or the like that tend to lodge in the bristles of the brush are removed therefrom by the fixed comb 57.

The cups 38 after having the excess peanuts removed therefrom by the brush 56 pass under the fixed curved apron 58 which serves to prevent the peanuts from falling out of these cups as they move downwardly to the lower position where they are to be discharged into the baskets 19. The cups and baskets are advanced in timed relation and are so arranged that there is one cup for each basket supported in a transverse row by a frame 20 and the angular distance between the cups corresponds to the distance between adjacent basket supporting frames 20. Furthermore, the timing of the movement of the baskets and cups is such that the basket will be positioned below a cup just as the latter moves out from under the lower end of the apron 38 so that all the peanuts in a cup will be discharged into the adjacent basket.

The baskets 19 upon receiving their charge of peanuts or other edibles are advanced through the chocolate chamber 10 as will be apparent from Fig. 1 and it is desirable to vibrate the filled baskets as they approach the chocolate coating position and while they are being coated as this will serve to shake the peanuts or the like down in the basket, and the vibration of the baskets while immersed in the chocolate will insure the application of the coating material to all portions of the cluster so that no uncoated portion of the cluster will appear in the finished confection. The desired vibration of the baskets is readily produced at this time by forming the side rails or runways 29 in sections, the first section being pivoted to the supporting structure of the machine at 59, and the desired vibratory movement is imparted to these chain supporting sections 29 by the ratchet wheels 60 disposed at the opposite sides of the machine and having cooperating therewith a projection 61 which extends downwardly from a bracket 62, the base of which bracket is rigidly secured to the runway section 29. The arrangement is such that as the shaft 63 to which the sprockets 60 are secured is rotated, a pronounced vibratory movement will be imparted to the runway sections 29 and the basket advancing chains 24 resting thereupon. A chocolate supporting plate 64 is preferably provided below the chocolate supplying basket 18 upon which sufficient chocolate will accumulate to completely immerse the baskets passing over the plate 64.

After the clusters within the baskets 19 have been completely coated in the manner just described it is desirable to remove the excess chocolate or other coating material and this is accomplished to a large degree by causing them to pass under the discharge nozzle 65 of a blower 66 driven by the motor 67. The arrangement is such that the warm air within the casing 10 is used over and over by the blower, since this air passes upwardly through the pipe 68 leading from the upper portion of the casing 10 to the suction side of the blower 66. The rapidly rotating blower forces air downwardly through the discharge nozzle 65 in the form of a strong jet that removes a large percentage of the hot chocolate from the clusters. In order to prevent the blast of the fan from blowing the peanuts or other edibles out of the baskets the wire screen 69 is provided to cover the tops of the baskets while they pass under the nozzle 65.

The excess chocolate that tends to cling to the freshly coated clusters may be further removed by continuing to vibrate the side chains and baskets being advanced thereby as they travel along the entire upper run of the chains, and to this end in the construction shown the runways 29 are shown as formed of three additional sections at each side of the machine and which are pivoted at 70, 71, and 72, and each of these sections is vibrated by a ratchet wheel and cooperating bracket 62, which have already been described.

While the clusters are being subjected to the action of the additional vibratory means just described they are maintained at the desired temperature by providing steam coils or the like 73 beneath the upper run of the baskets and a cover of sheet metal or the like is provided above the baskets to help confine the heat. In many cases, however, the hot chocolate deposited upon the clusters will supply sufficient heat to the chamber above the steam pipes 73 to prevent the chocolate from becoming too stiff in the baskets 18, and in this case the steam pipes need be used only to melt the chocolate from the baskets after the machine has been standing idle.

In any event the temperature of the chocolate in the baskets 18 should be such that by the time the baskets reach the discharge end of the machine the chocolate should be sufficiently stiff to cause the clusters to assume a well mounded shape when they are discharged from the baskets, and the vibratory movement imparted to the baskets at this time should remove all excess chocolate from the clusters before they reach the sprockets 27. The baskets then travel down the inclined runway 74 towards the lower sprockets 28 and the baskets are maintained in a horizontal position at this time by causing the rear side of each frame 20 to rest upon the inclined runway 74, as will be apparent from Fig. 6.

As each basket supporting frame 20 moves downwardly to the lower run of the chains 24 it is desirable to quickly turn the baskets over with a blow effect so as to jar the clusters out of each basket and thereby make sure that every basket is emptied at this time. This is an important feature of the present invention and is accomplished in accordance with the embodiment of the invention shown by providing the lower sprockets 28 with the inwardly extending fixed studs 75 which lie in the path of the downwardly moving frames 20. The arrangement is such that as a forward side of a frame is carried downwardly around the lower sprockets 28 the ends of the frame 20 will engage the studs 75 to tilt the baskets to the successive positions in which they are shown in dotted lines in Fig. 8 until the basket supporting frame has been tilted sufficiently about the pivot pins 25 to cause the frame to fall over by gravity and strike with considerable force against the dumping rail 76. This serves to jar the clusters 77 out of the baskets on to a traveling apron or tray 78 positioned directly below the baskets being emptied, whereupon the emptied baskets and tray or apron 78 are advanced in a left hand direction viewing Fig. 8 at the same rate of speed so that the chocolate which continues to drop from the baskets will fall upon the clusters to help fill out and build up the upper curved surface thereof. As the emptied baskets continue to travel in a left hand direction viewing Fig. 8, they move up the inclined guide way 79 away from the clusters now resting upon the traveling apron or trays 78.

The hot freshly coated clusters 77 in the construction shown are deposited upon the trays 78 which are carried by the chains 80 and these trays with the clusters thereon may be advanced through a cooling tunnel or other cooling means and then the clusters may be packed in boxes or other containers ready for the market.

In the construction shown all portions of the cluster forming machine with the exception of the blower 66 are operated by the motor 81 which through the train of gears 82 and 83 and chain 84 drive the main power shaft 85. This shaft through the chain 86 drives the chocolate pump 13 and the operation of this pump may be controlled by shifting the clutch operating lever 87. The basket advancing chains 24, hopper feeding mechanism and vibrator 50 are all driven from the shaft 85 through driving connections controlled by the hand operated lever 88, and the means for driving the tray advancing chains 80 is operated by the shaft 89 controlled by the clutch operating lever 90. The drum for supplying the fillings to the baskets 19 are driven from the sprocket shaft 91 by the chain 92 and the brush 56 is driven from the drum shaft 37 by the chain 93. The sprocket which is driven by the chain 92 to rotate the shaft 37 is preferably loosely mounted upon the shaft and connected thereto by a clutch 94 which may be manually operated to start and stop the feeding mechanism as desired.

The chocolate which drops from the baskets traveling along the upper run of the chains 24 may fall upon a plate 95 for returning the chocolate to the tank 11, and the chocolate that falls upon this plate may be advanced along the same toward the coating receptacle by the lower run of the endless wire apron 96. The basket advancing chains 24 and associated parts are supported at the receiving and delivery sides of the casing 10 by the extensions 97 which may be formed to enclose the basket advancing mechanism to keep the parts warm. These parts may be heated as desired by the steam pipes 73 below the plate 95.

Any tendency of the peanuts or the like to lodge in the throat of the hopper 30 may be prevented by providing the fingers 98 that project laterally from the sliding rod 99 into the throat just mentioned. The rod 99 is shifted slightly in the direction of its length by the grooved cam or drum 100 secured to the shaft of the brush 56 to be rotated thereby, and adapted to cooperate with an arm 101 to impart the desired sliding movement to the rod 99. Fingers 102 extending from the rod 99 into a position above the cup filling position help to work the peanuts into the cups 38.

In the construction shown the coated clusters are discharged from the baskets 19 onto trays 78, each of which is of a size to receive nine transverse rows of clusters. The feed drum 35 is, therefore, shown as provided with nine transverse rows of cups and a substantial gap in one complete revolution and arranged so that the gap corresponds to the space between two adjacent trays. Likewise a basket carrying frame 20 may be omitted opposite said gap to prevent a row of clusters from being delivered between the adjacent ends of two trays.

It will be seen from the foregoing that the mechanism of the present invention serves to accurately measure out the desired quantity of peanuts or other fillings to be delivered to each basket whereupon these baskets are passed through a stream of chocolate so that they are completely immersed in the chocolate and that means is provided for energetically vibrating the baskets at this time to insure complete coating of the clusters. The excess coating is then removed from the clusters by the action of the strong air blast delivered by the nozzle 65 and the energetic vibrating effect produced by the vibration of the runway sections pivotally supported at 70, 71 and 72.

It will also be apparent that as each basket supporting frame 20 reaches the unloading position the row of baskets is quickly turned over with a pronounced blow effect which jars the clusters out of the baskets and thus avoids the danger of any cluster remaining in its basket, and being conveyed back to the loading position.

As a result of the means of the present invention for preventing the clusters from remaining in the inverted baskets, the coating operation may be carried out at lower temperatures than heretofore. This facilitates the formation of clusters that have a well mounded shape of pleasing appearance and prevents the cluster from flattening out to an objectionable degree as has frequently been the case heretofore.

Furthermore, coated clusters of much lower chocolate content can be made on the present machine than on the machines used heretofore, since the present machine serves to coat every portion of each cluster and then remove all excess chocolate, as will be apparent from Fig. 9 wherein it will be seen that very little chocolate remains deposited in the depressions between the nuts at the base or bottom of the cluster 77.

This results in a pronounced saving in the manufacturing cost of the coated clusters, since peanuts cost much less per pound than chocolate and by reducing the percentage of chocolate in a cluster to fifty percent. of the weight of the peanuts or less the total cost of the cluster is materially reduced.

What is claimed is:—

1. The method of making coated cluster confections which consists in advancing a series of cluster holding baskets with a continuous travel along an endless path, depositing cluster fillings in the moving baskets, applying a coating material to the fillings in the baskets and regulating its temperature so that it will be sufficiently stiff upon reaching the discharge point to cause the clusters to assume a well mounded shape when discharged from the baskets, and turning the baskets over with a quick striking action to produce a blow as the baskets reach an inverted position so as to loosen the clusters and cause them to fall out of the baskets.

2. The method of making coated cluster confections which consists in advancing a series of cluster holding baskets along a predetermined path, depositing cluster fillings in the baskets, applying a coating material to the fillings in the baskets and regulating its temperature so that it will be sufficiently stiff upon reaching the discharge point to cause the clusters to assume a well mounded shape when discharged from the baskets, turning the baskets over with a quick striking action to produce a blow adapted to dislodge the clusters from the baskets to fall upon a traveling support, and advancing the support and baskets together to cause the coating material dripping from each basket to fall upon the cluster discharged therefrom.

3. The method of making coated cluster confections which consists in advancing a series of cluster holding baskets with a continuous travel along a predetermined path, depositing cluster fillings in the moving baskets, passing the baskets with the fillings therein through coating material and vibrating the baskets at this time to insure complete coating of the clusters, further vibrating the baskets after the coating has been applied to remove excess coating material, and turning the baskets over with a quick striking action to jar the coated clusters out of the baskets.

4. The method of making coated cluster confections which consists in advancing a series of cluster holding baskets with a continuous travel along a predetermined path, depositing cluster fillings in the moving baskets, passing the baskets with the fillings therein through coating material and vibrating the baskets at this time to insure complete coating of the clusters, directing an air blast against the coated clusters and vibrating them to remove the excess coating material, and turning the baskets over with a quick striking action to jar the coated clusters out of the baskets.

5. A cluster forming machine, comprising in combination, a pair of endless chains each having an upper and lower run and an angularly disposed run sloping downwardly from the upper to the lower run, basket supporting frames pivoted to the chains at one side of their central longitudinal axis and each provided with a row of cluster holding baskets, means for depositing confection fillings in the baskets, means for applying coating material to the fillings in the baskets, a guide for supporting the baskets in a horizontal position as they move down said angularly disposed run, and means for quickly turning each basket frame over as it approaches said lower run to cause the frame to strike against an abutment and jar the clusters out of the inverted baskets.

6. An automatic feeder for measuring and delivering predetermined quantities of edibles to receiving means, comprising in combination, a drum provided with edible receiving cups supported for vibratory movement, a hopper for supplying edibles to the cups, means for rotating the drum, and means for vibrating each cup relative to the supporting drum as it is being filled to settle the edibles therein.

7. An automatic feeder for measuring and delivering predetermined quantities of edibles to receiving means, comprising in combination, a drum provided with edible receiving cups supported for vibratory movement, a hopper for supplying edibles to the cups, means for rotating the drum, and means for vibrating each cup while it is being emptied to dislodge the edibles therefrom.

8. An automatic feeder for measuring and delivering predetermined quantities of edibles to receiving means, comprising in combination, a rotatable drum provided with cups each having a portion supported for vibrating movement relative to the drum, a hopper for supplying edibles to the cups, means for rotating the drum, and means cooperating with said portions of the cups and adapted to be vibrated relative to the drum to shake said portions and the edibles in the cups.

9. An automatic feeder for measuring and delivering predetermined quantities of edibles to receiving means, comprising in combination, a rotatable drum provided with cups each having a portion supported for vibratory movement relative to the drum, a hopper for supplying edibles to the cups, means for rotating the drum, and means operable to vibrate said portions relative to the drum to dislodge the edibles from the cups.

10. An automatic feeder for measuring and delivering predetermined quantities of edibles to receiving means, comprising in combination, a rotatable drum provided with edible receiving cups arranged in rows about the axis of the drum and each cup having an adjustable bottom, and mans connected to the bottoms of all of the cups of the different rows and operable to simultaneously adjust the bottoms of the cups of different rows to change the capacity of all the cups of all the different rows of cups at the same time.

11. An automatic feeder for measuring and delivering predetermined quantities of edibles to receiving means, comprising in combination, a drum provided with cups formed with tubular walls mounted for rocking movement in the drum, means for rotating the drum, a hopper for delivering edibles to the cups, bars extending lengthwise of the drum and connected to said tubular walls, and means for vibrating said bars to shake the tubular walls while the edibles are in the cups.

12. An automatic feeder for measuring and delivering predetermined quantities of edibles to receiving means, comprising in combination, a drum provided with cups formed with tubular walls mounted for rocking movement in the drum, means for rotating the drum, a hopper for delivering edibles to the cups, bars slidably supported by the drums to rotate therewith and connected to said tubular walls, and notched means supported in the path of said bars and adapted to vibrate the bars to shake said tubular walls.

13. A cluster forming machine, comprising in combination, a pair of endless chains, basket supported frames pivotally connected to the chains and provided with cluster holding baskets, a rotating drum provided with pockets for delivering edibles into the baskets, driving means for advancing the chains with a continuous movement, coating means for coating the edibles carried by the baskets, and means for quickly turning the frames over as they reach a predetermined position to jar the clusters out of the basket so as to form well mounded clusters.

14. A cluster forming machine, comprising in combination, a pair of endless chains, basket supporting frames pivotally connected to the chains and provided with cluster holding baskets, a rotating drum provided with cups for delivering edibles into the baskets, means for vibrating said cups to jar the edibles down in the upper cups and to dislodge them from the lower cups, driving means for the chains, coating means for coating the edibles carried by the baskets, and means for quickly turning the frames over as they reach a predetermined position to jar the clusters out of the inverted baskets.

15. A cluster forming machine, comprising in combination, a pair of endless chains each having an upper and lower run, a chain runway having pivotally mounted sections for supporting the upper run of each chain, basket supporting frames carried by the chains, means for depositing confection fillings in the baskets, means for applying coating material to the fillings in the baskets, mechanism for vibrating each runway section about its pivotal mounting with an up and down swinging movement to dislodge the excess coating material from the baskets, and means for turning the baskets over quickly so as to produce a blow that dislodges the clusters from the baskets.

16. A cluster forming machine, comprising in combination, a pair of endless chains each having an upper and lower run and an angularly disposed run sloping downwardly from the upper to the lower run, basket supporting frames carried by the chains, means for depositing fillings in the baskets, means for applying coating material to the fillings in the baskets, means for maintaining the baskets upright as they move down said angular run, and means for quickly turning each basket frame over as it approaches said lower run to cause the frame to strike against an abutment and jar the clusters out of the inverted baskets.

17. A cluster forming machine, comprising in combination, a pair of endless chains each having an upper and lower run and an angularly disposed run sloping downwardly from the upper to the lower run, basket supporting frames pivoted to the chains at a point frontwardly of their central longitudinal axis, means for depositing fillings in the baskets and for coating the fillings therein, means for maintaining the pivoted frames substantially horizontal as they move down said angular run, and a projection near the lower end of said inclined run in the path of the basket frames and adapted to turn each frame over as it reaches said lower run to cause it to strike against an abutment and jar the clusters out of the inverted baskets.

18. A cluster forming machine, comprising in combination, a pair of endless chains each having an upper and lower run and an angularly disposed run sloping downwardly from the upper to the lower run, basket supporting frames pivoted to said chains, means for depositing fillings in the baskets and for coating the fillings therein, means for maintaining the pivoted frames substantially horizontal as they move down said angular runway, a cluster carrier advanced below said lower run in the same direction as the lower run, and means for turning each frame over as it reaches the lower run with a blow action to jar the clusters out of the inverted baskets into said carrier.

JESSE W. GREER.